Jan. 17, 1933. H. A. LEONHAUSER 1,894,565
AUTOMATIC SLACK ADJUSTER
Filed April 8, 1930   2 Sheets-Sheet 2
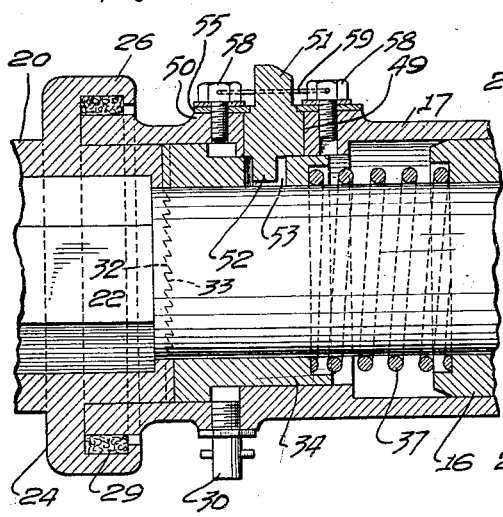
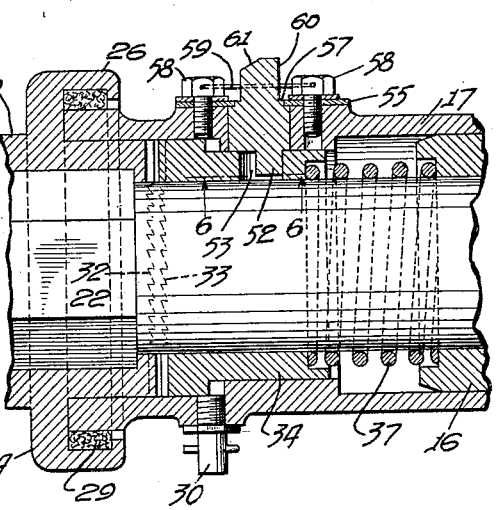
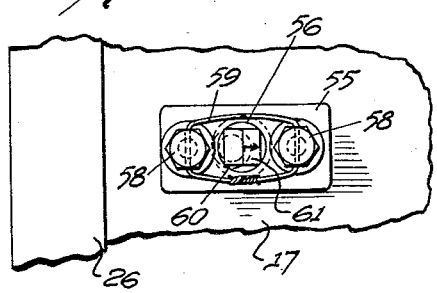
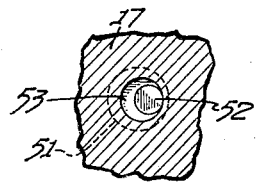
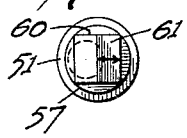
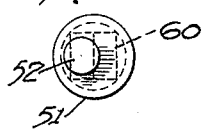
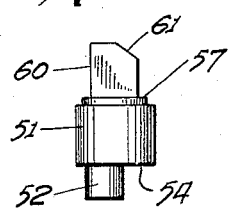
Inventor
Henry A. Leonhauser
By
his Attorney Patented Jan. 17, 1933

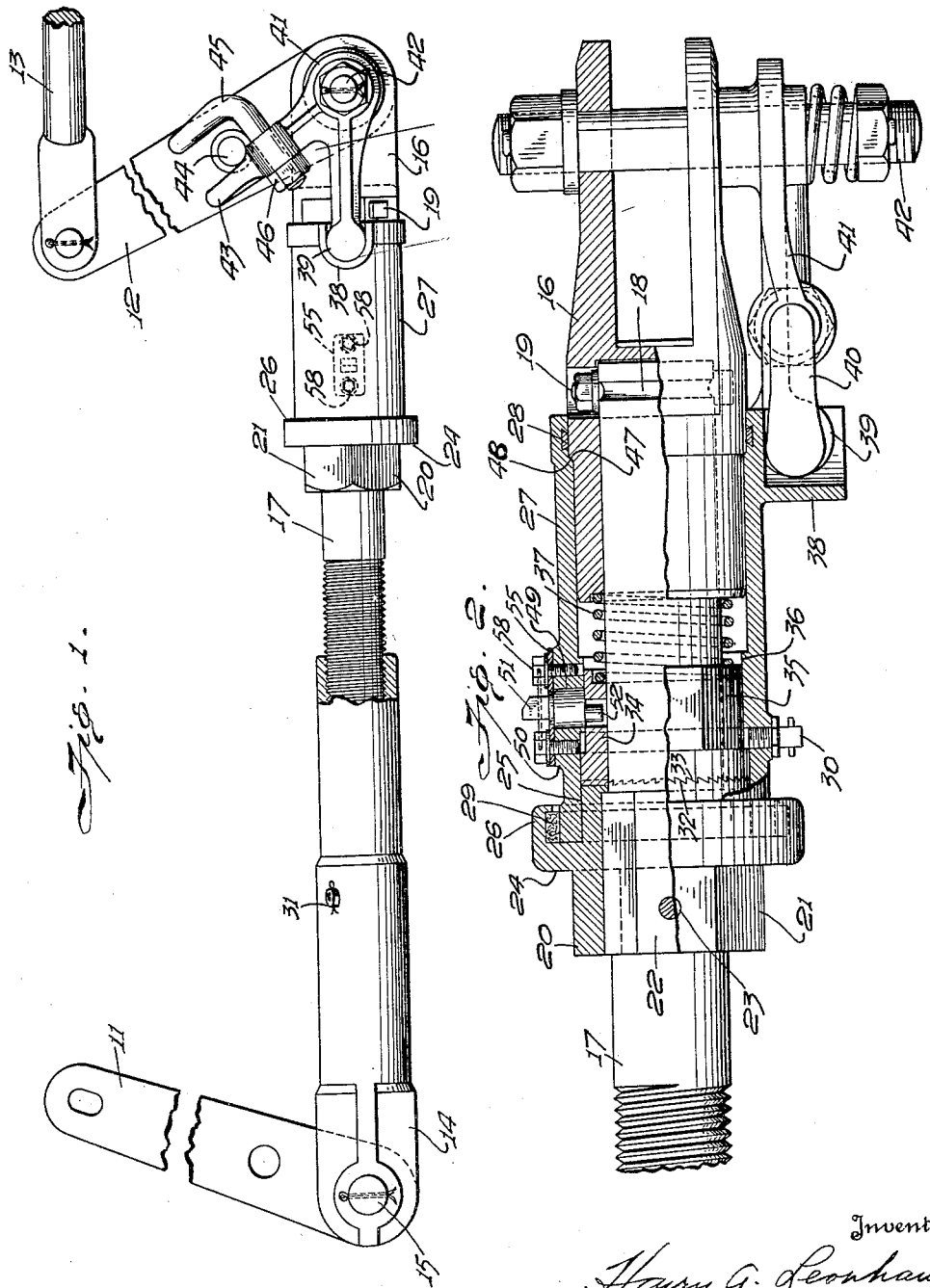

1,894,565

UNITED STATES PATENT OFFICE

HENRY A. LEONHAUSER, OF BALTIMORE, MARYLAND

AUTOMATIC SLACK ADJUSTER

Application filed April 3, 1930. Serial No. 442,610.

The invention relates to automatic slack adjusters and is an improvement over the mechanism disclosed in Patent No. 1,631,969 granted to me on June 14th, 1927, and also an improvement on the structure shown in my application for patent for slack adjusters, filed August 9th, 1929 and given Serial No. 384,692.

The principal object of the invention, generally stated, is to provide an automatic slack adjuster for use as a part of brake rigging for automatically compensating for the wear on the brake shoes, car wheels, brake rigging and other parts so as to maintain uniform clearance between the brake shoes and car wheels and uniform movement of the brake applying devices.

In said patent and said application, above identified, I have disclosed a structure embodying a ratchet mechanism operating in conjunction with a screw for moving the parts from time to time to take up the wear.

The important object of the present invention is to provide means in a slack adjuster of this type for effecting disconnection of the ratchet mechanism to permit the screw device to be turned manually the necessary distance when it is desired to replace a worn out brake shoe, instead of it being necessary to remove one of the brake rod pins as is an essential step in the ordinary construction.

Another object of the invention is to provide in a slack adjuster a ratchet mechanism which will be very easily shiftable from effective to ineffective position depending upon the requirements of the particular circumstances, means being moreover provided for positively holding the ratchet mechanism against any possible disconnection from the screw device accidentally while the entire apparatus is in operation.

Still more specific object is to provide a ratchet type slack adjuster in which there is incorporated a cam or eccentric operated shiftable ratchet device easily capable of manual manipulation when the occasion arises.

An additional object is to provide a mechanism of this character which will be simple and inexpensive to make, easy to use, positive in action, efficient and durable in service, and a general improvement in the art.

To the attainment of the foregoing and other objects and advantages, the invention preferably consists in the details of construction and the arrangement and combination of parts to be hereinafter more fully described and claimed, and illustrated in the accompanying drawings in which:

Figure 1 is a view partly in elevation and partly in section disclosing a slack adjuster equipped with the invention, Figure 2 is a view partly in elevation and partly in horizontal section of a part of the structure shown in Figure 1, Figure 3 is a fragmentary section showing the shiftable ratchet device or member in operative or effective position, Figure 4 is a similar view showing this member shifted to ineffective position, Figure 5 is a fragmentary elevation looking at the shifting means, Figure 6 is a detail section taken on the line 6—6 of Figure 4, Figure 7 is a detail view of the shifting eccentric or cam, Figure 8 is an elevation of one end thereof, and Figure 9 is an elevation of the opposite end.

Referring more particularly to the drawings, it should of course be understood that in the construction shown the brakes are adapted to be operated by brake beams of the usual character, not shown, the brake beams being connected respectively to a dead lever 11 and a live lever 12, the latter being operated by a link or rod 13. At the lower end of the dead lever 11 is a head 14 pivoted thereto at 15, and at the lower end of the lever 12 is pivoted a head 16, the two heads being connected by a rod 17 threaded into the head 14 as shown in Figure 1. The other end of the rod 17 extends into the head 16 and is formed adjacent its extremity with an annular groove 18 receiving a bolt 19 which passes through the head in tangential relation to the bottom of the groove. The purpose of the bolt and groove is to restrain the parts against relative longitudinal movement.

Secured upon the rod 17 in spaced relation to the head 16 is a collar 20 having a hexagonal or other angularly formed portion 21 by means of which it may be readily turned through use of a suitable wrench or other auxiliary tool. Within the confines of this rod 17 is formed with a hexagonal or other angular portion 22 providing a drive connection, and relative longitudinal movement of the parts is prevented as by a pin 23 which passes through the collar and the rod. Preferably, the collar 20 is provided with an outwardly extending flange 24 adjacent which is an annular bearing portion 25, and at its outer edge the flange 24 terminates in an overhanging or coaxial flange 26 projecting over and in spaced relation to the bearing surface 25 for a purpose to be described. Rotatably mounted upon the bearing surface 25 is a housing sleeve 27 which also bears upon the end portion of the head 16. For the exclusion of dust, dirt and other foreign matter and to prevent leakage of lubricant from the interior of the housing sleeve, it is preferable to provide a gasket 28 on the inner periphery of the sleeve contacting the head 16, and to provide a packing 29 retained beneath the overhanging flange 26 and making a leak-proof joint between the collar 20 and the housing sleeve. It is intended that the interior of the housing sleeve be kept filled with lubricant which may be introduced through a grease or oil cup 30 which is preferably of the spring pressed ball type though it is conceivable that any other preferred variety may be used. The head 14 may also be equipped with a similar grease cup 31 so that oil or grease may be introduced for lubricating the threaded portion of the rod 17 within the head 14.

Within the confines of the sleeve 27 the collar 20 has its end face serrated or provided with ratchet teeth 32 intended to cooperate with similar teeth 33 on a ratchet sleeve 34 which is intended to be non-rotatable but longitudinally movable with respect to the sleeve 27 and other parts. This latter feature is very simply accomplished by forming at least a portion of the exterior surface of the sleeve 34 with a hexagonal or other angular portion 35 engaging within a correspondingly formed portion 36 of the sleeve 27. A coil spring 37 surrounds the rod 17 and abuts at one end against the end of the head 16 and at its other end against the confronting face of the ratchet sleeve 34 so that under normal circumstances the teeth 32 and 33 will be held in engagement. Clearly the sleeve 34 can, however, be moved longitudinally against the spring resistance so that the teeth will be disengaged.

The operating means comprises a socket 38 projecting laterally from one end of the housing sleeve 27 and receiving the ball end 39 of an arm 40 of a rocker 41 which is pivoted at 42 on the same element which pivotally connects the live lever 12 with the head 16. The other arm 43 of the rocker extends adjacent a fulcrum pin 44 and carries an adjustable finger 45 held in selected position by a nut 46. The purpose of this adjustment is to permit the finger 45 to be located at a selected distance from the fulcrum pin 44.

It will be observed that longitudinal movement of the housing sleeve 27 with respect to the other parts is prevented in one direction by engagement of its end with the flange 24. Movement in the other direction is prevented by a shoulder 47 on the intermediate portion of the head 16 engaging a shoulder 48 formed within the housing sleeve.

The structure thus far described corresponds to that disclosed in my patent above identified and substantially to that shown in my co-pending application. In the operation up to this point it will be understood that when the brakes are applied by movement of the link 13 to the right, the fulcrum pin 44 of course plays between the arm 43 and the finger 45, the latter being initially adjusted so that this play may be regulated. In case there is looseness or wear necessitating excessive movement of the link 13 and lever 12, the fulcrum pin 44 will engage the finger 45 and rotate the rocker 41 upon its pivot 42, the ball end 39 of the arm 40 moving upwardly and partially rotating the housing sleeve 27, and with it the ratchet sleeve 34 which is splined with respect thereto. When the extent of this movement is equal to the width of one of the ratchet teeth 32 or 33, the teeth 33 will slip over the teeth 32 and re-engage them in advanced relation so that when the brakes are released, by movement of the parts 13, 12 and 41 in the opposite direction the collar 20 and rod 17 will be turned slightly, thereby moving the rod 17 longitudinally so that it will project to a slightly greater extent beyond the head 14, thus taking up the looseness.

All of the foregoing is necessary to a proper understanding of the present invention which consists in providing a quickly and easily releasable relation between the ratchet sleeve and the serrated collar. In carrying out the invention I form the housing sleeve 27 with a cylindrical opening 49 located within a thickened or boss portion 50, and mount within this opening a rotary cylindrical bolt member 51 provided with an eccentrically located pin or extension 52 engaging within an opening 53 in the ratchet sleeve 34. The shoulder 54 defined at the juncture of the pin or extension 52 with the member 51 bears against the outer periphery of the ratchet sleeve 34 for preventing movement of the member 51 radially with respect to the rod 17. Movement in the other direction is prevented by means of a plate 55 having an opening 56 therein receiving a reduced extension 57 on the member 51, this plate being held in position as by cap screws 58 having apertured heads for the passage of a tie wire 59 which will operate to prevent any possible unscrewing. Beyond the plate 55 the member 51 is formed with an angular shank or extension 60 adapted for engagement by a wrench of some suitable sort so that the member 51 may be turned. It is a convenient plan that one corner of the extension 60 be beveled off as at 61 so that the operator may know at a glance the position of the member 51.

Under normal circumstances the member 51 is in the position shown in Figures 2 and 3, the eccentric pin or extension 52 being then at its extreme left hand position. However, the opening 53 in the sleeve 34 is of such diameter as to provide sufficient clearance at the sides of the eccentric to permit the sleeve 34 to move, in accordance with the operation above described, with respect to the serrated face of the collar 20. Whenever it is desired to replace worn out brake shoes, instead of removing one of the brake rod pins as is the customary practice, it is merely necessary, with my invention, to engage a suitable wrench upon the angular shank or extension 60 and rotate the member 51 a half turn. As this is done the eccentric pin or extension 52 will engage against the extreme right portion of the wall of the opening 53 and slide the ratchet sleeve 34 to the right, against the resistance of the spring 37. This disengages the ratchet teeth and the collar 20 may then be easily turned by hand the necessary distance to permit the old brake shoe to be removed and replaced by a new one. After the parts are properly assembled the member 51 should be turned back to its original position so that the ratchet teeth 32 and 33 may again cooperate. The releasability of this ratchet device in no way interferes with the general operation of the slack adjuster as above set forth. The improvement constituting the subject matter of this invention is simply for the purpose of facilitating repairs and replacements and will naturally effect a considerable saving in time and labor.

From the foregoing description and a study of the drawings it will be apparent that I have thus provided a very simple arrangement for the purpose specified and one which will not add to any great extent to the cost of production. Any slight increase is more than compensated for by the saving of time and labor as above mentioned. It is thought that the construction, operation and advantages will be readily apparent to one skilled in the art without further explanation.

While I have shown and described the preferred embodiment of the invention, it should be understood that the disclosure is merely an exemplification of the principles involved as the right is served to make all such changes in the details of construction as will widen the field of utility and increase the adaptability of the device provided such changes constitute no departure from the spirit of the invention or the scope of the claims hereunto appended.

Having thus described the invention, I claim:

1. In a slack adjuster, brake-lever connecting means comprising heads connected to said brake levers and an intermediate rod having threaded engagement with one of said heads and rotatable engagement with the other of said heads, and means for rotating said intermediate rod in one direction upon excessive movement of the brake levers comprising a ratchet member rigid with said intermediate rod, a second ratchet member rotatable relative to said rod, resilient means for holding said ratchet members in engagement, a sleeve rotatable upon said rigid ratchet member and having a guideway therein receiving said second ratchet member and adapted to transmit rotary motion thereto, said rigid ratchet member having a non-circular portion outside said sleeve to facilitate adjustment by hand, means operable by motion of one of the brake levers for oscillating said sleeve, and means for disengaging said ratchet members.

2. In a slack adjuster, a brake lever connecting means comprising heads connected to the brake levers and an intermediate rod connecting said heads, said rod having threaded engagement with one head and rotatable engagement with the second head, a collar rigid with said rod and having ratchet teeth on one end face, a second collar rotatable and slidable on said rod and having ratchet teeth on one end face for engagement with those of said rigid collar, a spring cooperating with said second head for holding said collars in engagement, said rigid collar and said second head having annular abutments, a sleeve engaged between said abutments to house said ratchet members and having means for rotating said second collar, means operable by movement of one of the brake levers for oscillating said sleeve, and means for moving and holding said rotatable and slidable collar out of engagement with said rigid collar.

3. In a slack adjuster, brake lever connecting means comprising heads pivoted to the brake levers, an intermediate rod having one end in threaded engagement with one head and having its other end rotatably connected to the second head and held from endwise movement relative thereto, a collar fixed upon said rod, a sleeve rotatably mounted between abutments on said collar and said second head, said collar having a flange surrounding the end of said sleeve, packing interposed between said sleeve and said flange and between said sleeve and said second head, mechanism housed in and operable by said sleeve for rotating said fixed collar and said rod in one direction, means operable by movement of the brake levers for oscillating said sleeve, and means for rendering said mechanism ineffective.

4. In a slack adjuster, brake lever connecting means comprising heads connected to the brake levers, an intermediate rod having threaded engagement with one head and having its other end rotatably received in the second head, means to prevent relative endwise movement of said rod and said second head, a sleeve rotatably mounted on said rod and said second head, clutching means comprising a spring and a member resiliently movable by said spring housed in said sleeve for transmitting rotary movement from said sleeve to said intermediate rod in one direction, means operable by movement of the brake levers for oscillating said sleeve, and means for rendering said clutching means ineffective.

5. In a slack adjuster, a brake lever connecting means comprising heads connected to the brake levers and an intermediate rod connecting said heads, said rod having threaded engagement with one head and rotatable engagement with the other, a ratchet member rigid with said rod, a second ratchet member slidable and rotatable on said rod and spring pressed into cooperative relation to the first named ratchet member, means housing said ratchet members, and means carried by the housing means for moving the second named ratchet member out of engagement with the first named ratchet member.

6. In a slack adjuster, a brake lever connecting means comprising heads connected to the brake levers and an intermediate rod connecting said heads, said rod having threaded engagement with one head and rotatable engagement with the other, a ratchet member rigid with said rod, a second ratchet member slidable and rotatable on said rod and spring pressed into cooperative relation to the first named ratchet member, means housing said ratchet members, means connecting the housing member with the second named ratchet member, means for oscillating the housing member, and means carried by the housing member and operable from the exterior thereof for retracting the second named ratchet member from engagement with the first named ratchet member.

7. In a slack adjuster, a brake lever connecting means comprising heads connected to the brake levers and an intermediate rod connecting said heads, said rod having threaded engagement with one head and rotatable engagement with the other, a ratchet member rigid with said rod, a second ratchet member slidable and rotatable on said rod and spring pressed into cooperative relation to the first named ratchet member, means housing said ratchet members, means connecting the housing member with the second named ratchet member, means for oscillating the housing member, and eccentric means carried by the housing member and operable from the exterior thereof for retracting the second named ratchet member from engagement with the first named ratchet member.

8. In a slack adjuster, a brake lever connecting means comprising heads connected to the brake levers and an intermediate rod connecting said heads, said rod having threaded engagement with one head and rotatable engagement with the other, a ratchet member rigid with said rod, a second ratchet member slidable and rotatable on said rod and spring pressed into cooperative relation to the first named ratchet member, means housing said ratchet members, means providing a drive connection between the housing member and the second named ratchet member, a rotatable member mounted through the wall of the housing member and operable from the exterior thereof, and an eccentric carried by said rotatable member and engaging within an opening in the second named ratchet member for retracting the same from engagement with the first named ratchet member.

9. In an automatic slack adjuster of the character described, a rotatably mounted adjusting member forming part of the brake rigging rod the length of which is to be varied for the purpose of adjusting the slack, a one-way clutch member affixed to the said adjusting member and coacting with a second one-way clutch member rotatably mounted around the same axis of rotation, means for resiliently keeping both of the clutch members into permanent engagement, a closed sleeve surrounding all of the aforesaid members and means, such sleeve member being rotatably mounted around the same axis as the clutch members, means for axially displaceable but non-rotatable connection between the sleeve and the aforesaid second clutch member, means for imparting an oscillating rotating movement to the said sleeve when braking, and externally operable means for manual release of the one-way clutch when required.

In testimony whereof I affix my signature.

HENRY A. LEONHAUSER.